(12) United States Patent
Amendola et al.

(10) Patent No.: US 7,220,290 B2
(45) Date of Patent: May 22, 2007

(54) SYSTEM FOR HYDROGEN GENERATION

(75) Inventors: Steven C. Amendola, Ocean, NJ (US); Michael Binder, Brooklyn, NY (US); Stefanie L. Sharp-Goldman, East Brunswick, NJ (US); Michael T. Kelly, Plainsboro, NJ (US); Phillip J. Petillo, Ocean, NJ (US)

(73) Assignee: Millennium Cell, Inc., Eatontown, NJ (US)

( * ) Notice: Subject to any disclaimer, the term of this patent is extended or adjusted under 35 U.S.C. 154(b) by 99 days.

(21) Appl. No.: 10/638,651

(22) Filed: Aug. 11, 2003

(65) Prior Publication Data

US 2004/0033194 A1   Feb. 19, 2004

Related U.S. Application Data

(60) Continuation of application No. 09/999,226, filed on Oct. 26, 2001, now Pat. No. 6,683,025, which is a division of application No. 09/479,362, filed on Jan. 7, 2000, now Pat. No. 6,534,033.

(51) Int. Cl.
*B01J 7/00* (2006.01)
*B01J 8/00* (2006.01)
(52) U.S. Cl. .......................... 48/61; 422/234; 422/235; 422/211; 422/222
(58) Field of Classification Search ................ 422/234, 422/235, 211, 222; 48/61; 423/648.1; 429/17, 429/20
See application file for complete search history.

(56) References Cited

U.S. PATENT DOCUMENTS 1,935,627 A * 11/1933 Falter ......................... 422/119
5,964,089 A * 10/1999 Murphy et al. ............... 60/286

* cited by examiner

*Primary Examiner*—Glenn Caldarola
*Assistant Examiner*—Tom P. Duong
(74) *Attorney, Agent, or Firm*—Dickstein Shapiro LLP

(57) ABSTRACT

The present invention relates to a composition and method for storage and controlled release of hydrogen. In particular, the present invention relates to the use of borohydride based solutions as a hydrogen storage source and a catalyst system to release hydrogen therefrom.

28 Claims, 11 Drawing Sheets

Figure 4A
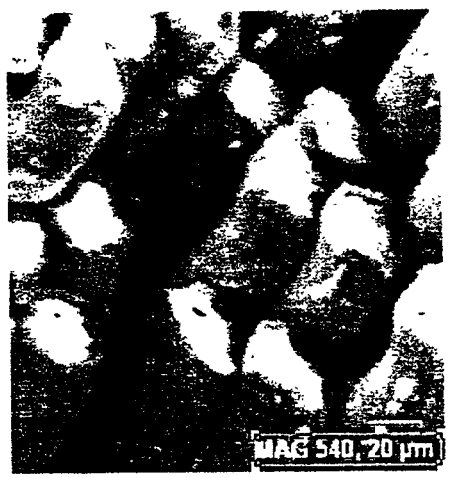
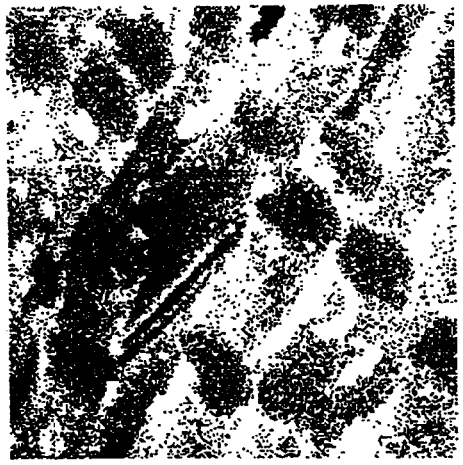
Figure 4B
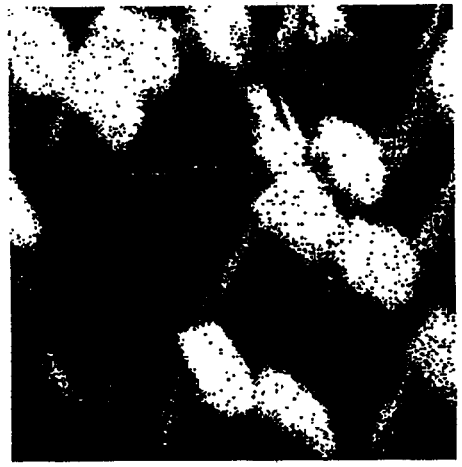
Figure 4 C

SYSTEM FOR HYDROGEN GENERATION

CROSS-REFERENCE TO RELATED APPLICATIONS

This application is a continuation of nonprovisional patent application Ser. No. 09/999,226, filed Oct. 26, 2001 entitled System for Hydrogen Generation, now U.S. Pat. No. 6,683,025 issued on Jan. 27, 2004, which, in turn, is a divisional application Ser. No. 09/479,362, now U.S. Pat. No. 6,534,033, filed on Jan. 7, 2000, entitled System for Hydrogen Generation.

FIELD OF THE INVENTION

The present invention relates to a system for generating hydrogen gas. In particular, the present invention relates to a hydrogen generation system including a stabilized metal hydride solution and a catalyst system.

BACKGROUND OF THE INVENTION

Hydrogen is a "clean fuel" because it can be reacted with oxygen in hydrogen-consuming devices, such as a fuel cell or combustion engine, to produce energy and water. Virtually no other reaction byproducts are produced in the exhaust. As a result, the use of hydrogen as a fuel effectively solves many environmental problems associated with the use of petroleum based fuels. Safe and efficient storage of hydrogen gas is, therefore, essential for many applications that can use hydrogen. In particular, minimizing volume and weight of the hydrogen storage systems are important factors in mobile applications.

Several methods of storing hydrogen currently exist but are either inadequate or impractical for wide-spread consumer applications. For example, hydrogen can be stored in liquid form at very low temperatures. Cryogenic storage, however, only provides a volume density of 70 grams of hydrogen per liter, which is clearly insufficient for consumer applications. In addition, the energy consumed in liquefying hydrogen gas is about 60% of the energy available from the resulting hydrogen. Finally, liquid hydrogen is not safe or practical for most consumer applications.

An alternative is to store hydrogen under high pressure in cylinders. However, a 100 pound steel cylinder can only store about one pound of hydrogen at about 2200 psi, which translates into 1% by weight of hydrogen storage. More expensive composite cylinders with special compressors can store hydrogen at higher pressures of about 4,500 psi to achieve a more favorable storage ratio of about 4% by weight. Although even higher pressures are possible, safety factors and the high amount of energy consumed in achieving such high pressures have compelled a search for alternative hydrogen storage technologies that are both safe and efficient.

Other methods of hydrogen storage include the use of chemical compounds that either (i) chemically react with water or other species to generate hydrogen or (ii) reversibly adsorb and then release the hydrogen. However, these methods and compounds suffer from many deficiencies, which make them unsuitable for use in consumer applications. These deficiencies include, high cost, poor safety, poor hydrogen storage capacities, decreased reversibility, poor hydrogen generation capacities, poor control of hydrogen generation, and high system complexities.

In view of the above, there is a need for safer, more effective methods of storing and recovering hydrogen. In addition, there is a need to meet the above requirements while minimizing overall system volume and weight. It is, therefore, an object of the present invention to provide safer and more efficient methods for storing and generating hydrogen. These and other objects of the invention will become more apparent from the detailed description and examples that follow

SUMMARY OF THE INVENTION

The present invention provides a supported hydrogen generation catalyst having molecules of a hydrogen generation catalyst bound to, entrapped within, and/or coated onto a substrate. Also provided is a process for making these catalysts, which includes: (A) contacting a substrate with a solution having a transition metal ion; and (B) contacting the resulting substrate of (A) with a reducing agent.

In another embodiment, the present invention also provides a process for producing a supported hydrogen generation catalyst by electrochemical plating. This process includes: placing a conductive substrate in a solution having a transition metal ion; and applying a voltage to the substrate to thereby electrochemically plate a transition metal coating onto the substrate. Preferably, a varying voltage is applied to obtain a transition metal black coating.

In still another embodiment, the present invention provides a process for producing a supported hydrogen generation catalyst by chemical vapor deposition. This process includes: evaporating a transition metal complex comprising a transition metal ion and a chemical vapor deposition complexing compound; recondensing the transition metal complex onto a substrate; and applying a reducing agent to the transition metal complex that is deposited on the substrate.

The present invention also provides a hydrogen generation system, which includes a stabilized metal hydride solution and a hydrogen generation catalyst system. The stabilized metal hydride solution has a metal hydride, a stabilizing agent, and water. The hydrogen generation catalyst system includes a hydrogen generation catalyst. Preferably, the catalyst system further includes a containment system.

BRIEF DESCRIPTION OF THE DRAWINGS

Further objects and advantages of the present invention will be more fully appreciated from a reading of the detailed description when considered with the accompanying drawings wherein:

FIGS. 4A, 4B, and 4C show a scanning electron micrograph and two X-ray scan micrographs, respectively, of a hydrogen generation catalyst having ruthenium supported on the fibers of a standard nylon rope, according to the present invention;

DETAILED DESCRIPTION OF THE PREFERRED EMBODIMENTS

Figure 1:
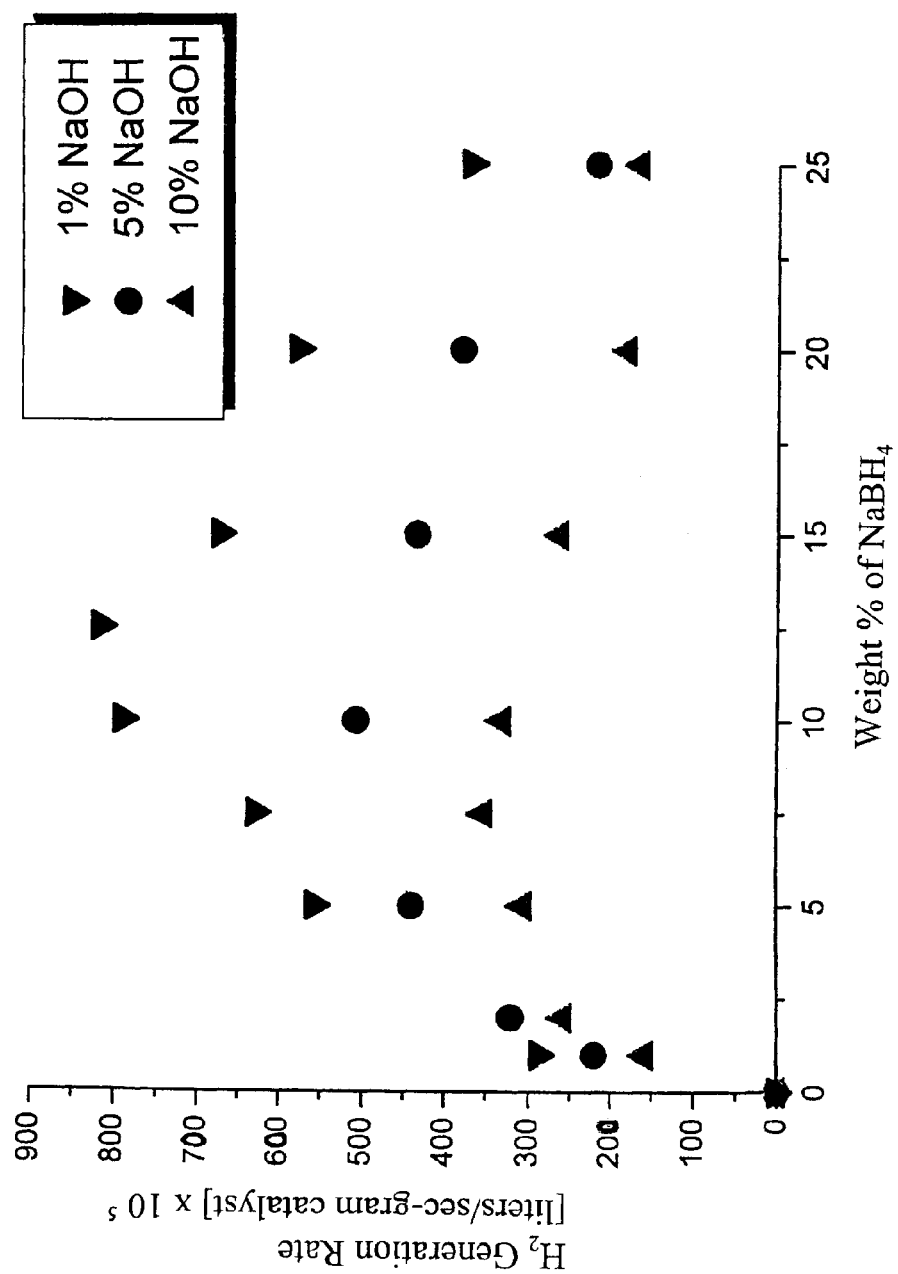
FIG. 1 shows a graph of hydrogen generation rates versus concentration of sodium borohydride utilizing a supported catalyst according to the present invention.

The present invention provides a novel hydrogen generation catalyst and hydrogen generation system utilizing the catalyst. The hydrogen generation system includes (i) a stabilized metal hydride solution and (ii) a catalyst system. The hydrogen generation systems of the present invention efficiently and safely provide hydrogen gas while avoiding many of the problems associated with prior methods of hydrogen generation. Furthermore, overall weight and volume are minimized in the hydrogen generation systems of the present invention.

I. The Stabilized Metal Hydride Solution

The stabilized metal hydride solutions of the present invention include (i) a metal hydride, (ii) at least one stabilizing agent, and (iii) a solvent. The term "solution," as used herein, includes a liquid in which all the components are dissolved and/or a slurry in which some of the components are dissolved and some of the components are undissolved solids. The term "about," as used herein, means plus or minus 10% of the stated value.

Complex metal hydrides have been found to be useful in the hydrogen generation systems of the present invention. These complex metal hydrides have the general chemical formula $MBH_4$. M is an alkali metal selected from Group 1 (formerly Group IA) of the periodic table, examples of which include lithium, sodium or potassium. M may, in some cases, also be ammonium or organic groups. B is an element selected from group 13 (formerly Group IIIA) of the periodic table, examples of which include boron, aluminum, and gallium. H is hydrogen. Examples of metal hydrides to be used in accordance with the present invention include, but are not limited to, $NaBH_4$:, $LiBH_4$, $KBH_4$, $NH_4BH_4$, $(CH_3)_4NH_4BH_4$, $NaAlH_4$, $LiAlH_4$, $KAlH_4$, $NaGaH_4$, $LiGaH_4$, $KGaH_4$, and mixtures thereof. Without wanting to be limited by any one theory, it is believed that metal hydrides, especially borohydrides, are most stable in water, i.e., the metal hydrides do not readily decompose when in contact with water. The following borohydrides are preferred: sodium borohydride ($NaBH_4$), lithium borohydride ($LiBH_4$), potassium borohydride ($KBH_4$), ammonium borohydride ($NH_4BH_4$), tetramethyl ammonium borohydride ($(CH_3)_4NH_4BH_4$), quaternary borohydrides, and mixtures thereof.

Hydrogen gas ($H_2$) and borate ($BO_2^-$) are generated by reacting borohydride with water, as illustrated by chemical reaction (1) below.

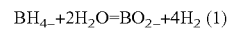

$$BH_{4-}+2H_2O=BO_{2-}+4H_2 \quad (1)$$

However, this chemical reaction occurs very slowly unless a catalyst is used. The resulting borate is non-toxic and environmentally safe. In addition, borate can be regenerated into borohydride. It is important to note that all of the hydrogen atoms present in borohydride and water are converted to hydrogen gas, and that half of the hydrogen atoms in the hydrogen gas produced by reaction (1) actually comes from the water. It is believed that the borohydride is capable of reducing protonic hydrogen in water to produce hydrogen gas while the borohydride is simultaneously oxidized to borate and hydrogen gas.

A theoretical hydrogen conversion ratio can be calculated from reaction (1). For example, if lithium borohydride is used, the total weight of the reactants is 58 grams/mole: one mole of lithium borohydride weighs 22 grams, and the two moles of water weighs 36 grams (2×18 grams/mole). Since 8 hydrogen atoms are produced, the theoretical hydrogen conversion ratio is 13.8% by weight of hydrogen (8÷58× 100).

The maximum solubilities of various borohydrides are as follows: $NaBH_4$—about 35% by weight of the stabilized metal hydride solution; $LiBH_4$—about 7% by weight of the stabilized metal hydride solution; $KBH_4$—about 19% by weight of the stabilized metal hydride solution. Weight percentages in excess of the maximum solubilities for each listed borohydride will result in a slurry, i.e., a liquid mixture having insoluble components. As is well known in the art, mixing or stirring means are typically used to help dissolve the solid components of a slurry with additional water. For example, in the above calculation 22 grams of lithium borohydride in 36 grams of water provides a 37.9% by weight solution of lithium borohydride (22÷58×100). Since the 37.9% by weight solution of lithium borohydride exceeds its maximum solubility, this fuel mixture is a slurry.

Since two water molecules are consumed for each borohydride molecule according to reaction (1), the concentration of all the remaining components (the cation, the borate, and the borohydride) will increase as the reaction continues. Therefore, twice as many water molecules as borohydride molecules are needed to sustain a constant rate of reaction. This excess water can be provided to the reaction in two ways: (i) charging the initial metal hydride solution with excess water, i.e., starting with a dilute solution, or (ii) adding more water from a separate source during or after the reaction. The second alternative is preferred to minimize the initial starting weight of water plus borohydride. Adding water from a separate source during or after the reaction is viable because the main byproduct of hydrogen oxidation in a hydrogen-consuming device is water. A hydrogen-consuming device, as used herein, means a device that uses hydrogen as a fuel, e.g., a fuel cell, combustion engine, or a gas turbine. Thus, water generated from the hydrogen-consuming device can be added to the borohydride solution. Assuming that water is recycled from the fuel cell or engine, 8 weight units of hydrogen (4 from water and 4 from borohydride) can come from 22 weight units of lithium borohydride. The resulting theoretical hydrogen conversion ratio is 36.36% by weight of hydrogen per unit of borohydride (8÷22×100). Therefore, the hydrogen generation system can include a slurry tank to store the borohydride and an adjacent mixing tank to add additional water obtained from the exhaust of the hydrogen consuming device, thereby allowing complete reaction of the borohydride while preventing the borohydride solution from drying out, i.e., preventing the components of the borohydride solution from precipitating out of solution.

The metal hydride solutions of the present invention include at least one stabilizing agent, since aqueous borohydride solutions slowly decompose unless stabilized. A stabilizing agent, as used herein, is any component which retards, impedes, or prevents the reaction of metal hydride with water. Typically, effective stabilizing agents maintain metal hydride solutions at a room temperature (25° C.) pH of greater than about 7, preferably greater than about 11, more preferably greater than about 13, and most preferably greater than about 14.

Useful stabilizing agents include the corresponding hydroxide of the cation part of the metal hydride salt. For example, if sodium borohydride is used as the metal hydride salt, the corresponding stabilizing agent would be sodium hydroxide. Hydroxide concentrations in stabilized metal hydride solutions of the present invention are greater than about 0.1 molar, preferably greater than about 0.5 molar, and more preferably greater than about 1 molar or about 4% by weight. Typically, metal hydride solutions are stabilized by dissolving a hydroxide in water prior to adding the borohydride salt. Examples of useful hydroxide salts include, but are not limited to, sodium hydroxide, lithium hydroxide, potassium hydroxide, and mixtures thereof. Sodium hydroxide is preferred because of its high solubility in water of about 44% by weight. Although other hydroxides are suitable, the solubility differences between various metal hydrides and various hydroxide salts must be taken into account since such solubility difference can be substantial. For example, adding too much lithium hydroxide to a concentrated solution of sodium borohydride would result in precipitation of lithium borohydride.

Other non-hydroxide stabilizing agents include those that can raise the overpotential of the metal hydride solution to produce hydrogen. These non-hydroxide stabilizing agents are preferably used in combination with hydroxide salts. Nonlimiting examples of non-hydroxide stabilizing agents include compounds containing the softer metals on the right side of the periodic chart. Nonlimiting examples of these non-hydroxide stabilizing agents include compounds containing lead, tin, cadmium, zinc, gallium, mercury, and combinations thereof. Compounds containing gallium and zinc are preferred, because these compounds are stable and soluble in the basic medium. For example, zinc and gallium form soluble zincates and gallates, respectively, which are not readily reduced by borohydride.

Compounds containing some of the non-metals on the right side of the periodic chart are also useful in stabilizing metal hydride solutions. Nonlimiting examples of these non-hydroxide stabilizing agents include compounds containing sulfur, such as sodium sulfide, thiourea, carbon disulfide, and mixtures thereof.

II. The Catalyst System

The hydrogen generation systems of the present invention also have a catalyst system, which includes a hydrogen generation catalyst. The hydrogen generation catalysts used herein activate the reaction of the metal hydride with water to produce hydrogen gas. Preferably, these catalyst systems also include a containment system for the catalyst. Containment system, as used herein, includes any physical, chemical, electrical, and/or magnetic means for separating the hydrogen generation catalyst from the reacted metal hydride solution, e.g., mixture of $BO_2^-$ and $BH_4^-$.

Preferably, the catalyst facilitates both aspects of the reaction of the metal hydride and water: (i) the availability of a hydrogen site and (ii) the ability to assist in the hydrolysis mechanism, i.e., reaction with hydrogen atoms of water molecules. Metal hydride solutions are complex systems having multi-step reduction mechanisms. For example, borohydride has 4 hydrogens and an 8-electron reduction mechanism. Thus, once a single hydrogen atom is removed from a borohydride molecule, the remaining moiety is unstable and will react with water to release the remaining hydrogen atoms. Catalysts that are useful according to the present invention include, but are not limited to, transitions metals, transition metal borides, alloys of these materials, and mixtures thereof.

Transition metal catalysts useful in the catalyst systems of the present invention are described in U.S. Pat. No. 5,804,329, issued to Amendola, which is incorporated herein by reference. Transition metal catalysts, as used herein, are catalysts containing Group IB to Group VIIIB metals of the periodic table or compounds made from these metals. Representative examples of these metals include, but are not limited to, transition metals represented by the copper group, zinc group, scandium group, titanium group, vanadium group, chromium group, manganese group, iron group, cobalt group, and nickel group. Transition metal elements or compounds catalyze chemical reaction (1) and aid in the hydrolysis of water by adsorbing hydrogen on their surface in the form of atomic H, i.e., hydride $H^-$ or protonic hydrogen $H^+$. Examples of useful transition metal elements and compounds include, but are not limited to, ruthenium, iron, cobalt, nickel, copper, manganese, rhodium, rhenium, platinum, palladium, chromium, silver, osmium, iridium, borides thereof, alloys thereof, and mixtures thereof. Ruthenium and rhodium are preferred.

The catalysts used in the catalyst systems of the present invention preferably have high surface areas. High surface area, as used herein, means that the catalyst particles have small average particles sizes, i.e., have an average diameter of less than about 100 microns, preferably less than about 50 microns, and more preferably less than about 25 microns. The chemical reaction of borohydride and water in the presence of the catalyst follows zero order kinetics at all concentrations of borohydride measured, i.e., volume of hydrogen gas generated is linear with time. It is, therefore, believed that the reaction rate depends primarily on the surface area of the catalyst.

One method of obtaining catalyst particles with high surface areas is to use catalysts with small average particle sizes. Although catalyst with small average particle sizes are preferred, small particles can be swept away by the liquid metal hydride solution if they are small enough to pass through the containment system. Such deficiencies can be avoided by forming large aggregates of the small catalyst particles. Large aggregate catalyst particles, as used herein, are masses or bodies formed from any small catalyst particles by well-known powder metallurgical, methods, such as sintering. These metallurgical methods can also be used in making various convenient shapes. It is believed that these large aggregate catalyst particles maintain high surface areas because they are very porous.

Alternatively, the hydrogen generation catalysts can be formed into fine wires or a mesh of fine wires. These fine wires have a diameter of less than about 0.5 mm, preferably less than about 0.2 mm, and more preferably less than about 20 microns. In this embodiment, the fine wires of catalysts do no require a containment system, since the fine wires of catalyst will provide a sufficient surface area for reaction with the metal hydride solution without the drawback of being swept away by the liquid metal hydride solution.

Preferably, the catalyst systems also include a containment system for the catalyst. The containment system employs any physical, chemical, electrical, and/or magnetic means to separate the hydrogen generation catalyst from the reacted metal hydride solution. As would be evident to one skilled in the art, the need for a particular containment system will depend on the particular application of the system for hydrogen generation. For example, if an uncontrolled supply of hydrogen is needed and no reuse of the system is desired, no containment system is needed. The stabilized metal hydride solution and the hydrogen generation catalyst can be separately packaged and combined when hydrogen is needed. Even this system can be reusable, if the hydrogen generation catalyst can be later separated to allow regeneration of the reacted metal hydride solution. If a reusable and controllable system is desired, a containment system can be used to produce hydrogen when needed, as described below.

In its simplest form, the containment system is a liquid and gas permeable mesh that traps or holds particulate catalysts, while allowing liquids and gases to pass freely through the containment system. In this embodiment the catalyst particles are larger than the spaces provided by the containment system. For example, metal hydride solution can flow into the containment system to react with the catalyst, while oxidized metal hydride, hydrogen gas, and unreacted metal hydride can easily pass out of the containment system. Alternatively, the containment system containing the catalyst can be lowered into the metal hydride solution when hydrogen is needed.

In this embodiment, the containment system is a porous or mesh material, which is preferably stable in the metal hydride solution. Porous or mesh materials can be formed into any configuration known in the art, which would keep the catalyst particles in a confined area while allowing entry and egress of liquids and gases. For example, a pouch or tea bag configuration can be used to encapsulate the catalyst particles, while allowing metal hydride solution and hydrogen gas to flow freely therethrough. Alternatively, the catalyst particles can be encapsulated in a removable tube or cylinder, wherein the ends of the cylinder are covered with the porous or mesh material. Porous or mesh material that are useful herein include ceramics, plastics, polymers, nonwovens, wovens, textiles, fabrics, carbons, carbon-fibers, ion exchange resins, metals, alloys, wires, meshes, and combinations thereof. Typically, the porous or mesh material is in the form of a sheet. Nonlimiting examples of porous or mesh material include nylon screens and stainless steel screens.

In another embodiment, separately packaged metal hydride solution and hydrogen generation catalyst can be combined when hydrogen is needed. Upon completion of the reaction, a containment system can then remove the catalyst by any known separation technique, such as centrifugation, precipitation, filtration, electrophoresis, and electromagnetism. For example, metallic hydrogen generation catalysts can be separated by employing a containment system that has a magnetic element. Nonlimiting examples of metallic hydrogen generation catalysts include iron, cobalt, nickel, and borides thereof. Alternatively, the mixture of catalyst and reacted metal hydride can be flushed out and later separated by a commercial processing center, which would recover the catalyst and regenerate the metal hydride solution.

In another embodiment, a contained high surface area catalyst can be obtained by attaching or binding the transition metal catalysts to a suitable substrate. The term "contained high surface area catalyst," as used herein, means that the catalyst is inherently maintained in a containment system and not free to migrate by itself, e.g., is attached to a substrate. In this embodiment, the metal hydride solution can pass over and/or through the substrate to react with the bound catalyst. Thus, hydrogen production can be controlled by either contacting or separating the bound catalyst from the metal hydride solution. If the substrate is in particulate form, a further containment system, as described above, is preferred to encapsulate the supported catalyst. For example, high surface area transition metal particles can be dispersed onto a solution cast film. Many substrates (e.g., ion exchange resins and plastics) can be dissolved into a solvent to form a solution or dispersion. The transition metal particles are then added. A solution cast film can be obtained by evaporating the solvent. The transition metal can be added in its salt or metal form and reduction steps can be taken if appropriate, as discussed below.

In a further example, a contained high surface area catalyst can be obtain by binding or entrapping a transition metal catalyst onto and/or within a porous or nonporous substrate by chemical means. By porous is meant that the material is liquid and gas permeable. Generally, this process includes (i) dispersing a solution having a transition metal ion onto and/or within a substrate by contacting the solution with the substrate, and (ii) reducing the dispersed transition metal ions to the neutral valence state of the transition metal, i.e., metallic form. Without wanting to be limited by any one theory, it is believed that this unique process binds and/or entraps transition metal catalyst at a molecule level onto and/or within the substrate. These steps can also be repeated to obtain layers of transition metal molecules bound onto and/or entrapped within the substrate. High surface area for substrate bound catalysts, as used herein, means that a porous substrate has an effective surface area of greater than about 10 m$^2$/g or and a nonporous substrate has an average diameter of less than about 50 microns. Nonlimiting examples of porous substrates include ceramics and ionic exchange resins. Nonlimiting examples of nonporous substrates include metals, wires, metallic meshes, fibers and fibrous materials, such as ropes. FIG. 1 is a graph of hydrogen gas generation rate ([liters/sec-gram catalyst]× 10$^5$) vs. concentration of sodium borohydride (% by weight) at 25° C. and at various concentrations of sodium hydroxide, using IRA 400 exchange resin beads containing 5% ruthenium by weight and having a particle size of about 35 mesh.

Transition metal ion, as used herein, means an anion, a cation, an anion complex or a cation complex of a transition metal that is described above. Transition metal ions can be obtained from dissolving salts of transition metals, which are readily available from commercial manufacturers, such as Alpha Company and Aldrich Company. The transition metal salts may be dissolved in any solvent, typically water. The reducing agent can be any material or compound that is capable of reducing the transition metal ion to its neutral valence state. Nonlimiting examples of reducing agents include hydrazine, hydrogen gas, glucose hydroxylamine, carbon monoxide, dithionite, sulfur dioxide, borohydride, alcohols and mixtures thereof. Typically, most transition metals that catalyze metal hydrides, such as borohydride, can also be reduced by the same metal hydrides. For example, borohydride is a suitable reducing agent.

Nonlimiting examples of suitable substrates include ceramics, plastics, polymers, glass, fibers, ropes, nonwovens, wovens, textiles, fabrics, the many forms of carbon and carbon-fibers, ion exchange resins, metals, alloys, wires, meshes, and combinations thereof. Nonlimiting examples of ceramic substrates with various pore sizes include metal oxides, zeolites, pervoskites, phosphates, metal wires, metal meshes, and mixtures thereof. Specific examples of suitable substrates include, but are not limited to zirconium dioxides, titanium oxides, magnesium oxides, calcium oxides, zeolites, cationic exchange resins, anionic exchange resins, fibrous materials, nonwovens, wovens, KEVLAR® fibers, and combinations thereof. Since metal hydride solutions can have a high pH, substrates that do not dissolve or react with caustics are preferred. Also preferred are porous substrates with effective surface areas of greater than about 50 $m^2$/g or nonporous substrates with an average diameter of less than about 50 microns.

When the substrate is in the form of beads, it is preferable to have the beads in a containment system, as described above, wherein the average diameter of the beads is greater than the spaces of the containment system. Furthermore, if the substrate has a surface treatment, such treatments can be removed by appropriate methods, such as by boiling or applying a solvent. For example, substrates treated with wax can be boiled. Alternatively, the wax can be removed by using acetone. Similarly, the starch on textiles can be removed by boiling in water.

The substrates, except for the ion exchange resins described below, can be treated with the catalyst in the following manner. The substrate is first soaked in a solution containing the transition metal salt, e.g., ruthenium trichloride. Solutions having concentrations close to saturation are preferred. This step disperses the transition metal salt into and/or onto the substrate. The treated substrate is then dried, typically with heat. Optionally, the treated substrate can be filtered before being dried. Note that the treated substrate is not rinsed. It is believed that the drying step promotes absorption of the transition metal ions onto and/or within the substrate by removing the solvent. The dry, treated substrate is then subjected to a solution containing a reducing agent, such as sodium borohydride, at a concentration sufficient to provide complete reduction, e.g., 5% by weight of sodium borohydride. Although this step can be conducted at room temperature, it is preferred to reduce the absorbed transition metal ions at an elevated temperature, e.g., greater than about 30° C., to increase the reduction rate. It is believed that the reduction step converts transition metal ions into its neutral valence state, i.e., the metallic state. After rinsing with water, the substrate is ready for use as a catalyst in the reaction of the metal hydride and water to produce hydrogen gas. The method can be repeated to obtain a desired loading of transition metal onto and/or within the substrate.

This method to obtain a contained high surface area catalyst can also be adapted to utilize chemical vapor deposition technology (CVD) by forming a transition metal complex that can be evaporated, i.e., boiled or sublimed, in a vacuum. The transition metal complex includes a transition metal ion, as described above, and a chemical vapor deposition complexing compound. Since the substrate is cold, the transition metal complex will recondense onto the substrate. Any suitable substrate, as described above, can be used. Any suitable chemical vapor deposition complexing compound that is known in the art can also be used. A nonlimiting example of a useful chemical vapor deposition complexing compound is acetyl acetenate ("AcAc") or 2, 4 pentane dione. Nonlimiting examples of transition metal complexes useful in CVD include Ru(AcAc), Co(AcAc)$_3$, and isopropoxide. The transition metal complex that is deposited on the substrate can then be reduced by any of the above described reducing agents.

Alternatively, this method can be adapted to utilize electroplating techniques, i.e., electroplating a conductive substrate in a solution having a transition metal ion. Useful transition metal ions are described above. The transition metal can be electroplated onto a conductive substrate, such as nickel or stainless steel fine wire, screens comprising such fine wires, or metallic sheets. Typically, such fine wires can have an average diameter of less than about 20 microns, preferably less than about 10 microns, and more preferably less than about 2 microns.

In one preferred mode of electrochemical plating, a rough coating is obtained instead of the typical smooth or "bright coatings." Without wanting to be limited by any one theory, it is believed that these rough coatings have a high surface area. These rough coatings are often black in color, and are typically referred to in the art of electrochemical plating by the element name followed by the word "black," e.g., platinum black or ruthenium black. Most of the transition metals described above can be coated as "transition metal blacks." The exact conditions may vary between the elements, but the common parameter is application of a varying voltage during the plating process. "Varying voltage" means that the voltage is changed, alternated, stepped up, or stepped down in a cyclic or noncyclic manner. For example, a DC voltage can be turned on or off over time. Alternatively, the current can be periodically reversed, or the voltage may be switched from a lower to higher voltage and then back to the lower voltage. It is also common to superimpose an AC signal onto a DC source.

While most of these substrates simply absorb the solution of transition metal salts, ion exchange resins offer some surprising and interesting characteristics. Ion exchange resins are porous polymeric materials having active groups at the end of the polymer chains. Typically, polymers used in ion exchange resins include, but are not limited to, polystyrene, epoxy amines, epoxy polyamines, phenolics, and acrylics. Ion exchange resins are classified into anionic exchange resins and cationic exchange resins. These resins are commercially available as beads, typically having particle sizes from about 20 mesh to about 100 mesh. The resins are also available as sheets and can be fabricated into any shape desired.

Anionic exchange resins attract anions because the active groups at the ends of the polymers have positive charges. Nonlimiting examples of positively charged active groups include a quaternary ammonium, tertiary amine, trimethyl benzyl ammonium, and/or dimethyl ethanol benzyl ammonium. Commercial anionic exchange resins are typically supplied in the $C^{31}$ or $OH^{31}$ form, i.e., easily replaceable chloride ions or hydroxide ions are bound to the active groups having positive charges. Commercially available anionic exchange resins include, but are not limited to, A-26, A-36, IRA-400 and IRA-900, manufactured by Rohm & Haas, Inc., located in Philadelphia, Pa.; DOWEX® 1, DOWEX® 2, DOWEX® 21 K, DOWEX® 550A, DOWEX® MSA-1, and DOWEX® MSA-2, manufactured by Dow Corporation; DUOLITE® A-101 D, DUOLITE® A-102 D, and DUOLITE® A-30 B; and IONAC® A-540, IONAC® A-550, and IONAC® A-300.

Cationic exchange resins attract cations because the active groups at the ends of the polymers have negative charges. Nonlimiting examples of negatively charged active groups include sulfonic acid, carboxylic acid, phosphonic acid, and/or aliphatic acid. Commercial cationic exchange resins are typically supplied in the $Na^+$ or $H^+$ form, i.e., easily replaceable sodium or hydrogen ions are bound to the active groups having negative charges. Commercially available cationic exchange resins include, but are not limited to, Nafion resins, manufactured by Dupont Corp., located in Wilmington, Del.; IRA-120 and Amberlyst 15 manufactured by Robin & Haas, Inc., located in Philadelphia, Pa.; DOWEX® 22, DOWEX® 50, DOWEX® 88, DOWEX® MPC-1, and DOWEX® HCR-W2 and DOWEX® CCR-1, manufactured by Dow Corporation; DUOLITE® C-3, DUOLITE® ES-63, and DUOLITE® ES-80; and IONAC® 240.

Anionic exchange resin beads are treated with the catalyst in the following manner. A transition metal salt is dissolved in an acid having the corresponding anion that can form an anionic complex of the transition metal. For example, ruthenium trichloride can be dissolved in hydrochloric acid to form chlororuthenic acid, wherein the ruthenium is contained in an anionic complex, i.e., $[RuCl_6]^{-3}$. Typically, the anionic complex of a transition metal is characterized by the chemical formula $[M^{y+}X_6]^{(Y-6)}$, wherein M is a transition metal, y is the valence of the transition metal, and X is an anion with a single negative charge. The concentration of the transition metal solution can be varied accordingly, but a concentration close to saturation is preferred. The acidic solution containing the anionic transition metal complex can then be exchanged onto the anionic exchange resin beads by contacting the anionic exchange resin beads with the anionic transition metal solution. Typically, this is done either by soaking the beads in the solution or dropwise adding the solution onto the beads. Without wanting to be limited by any one theory, it is believed that the anion associated with the active group of the resin is exchanged with the anionic transition metal complex. Exchange, as used herein, means that the ion associated with the active groups of the ion exchange resin, e.g., the chloride, is substituted with the ion of the transition metal. As a result, a very strong chemical (ionic) bond is formed between the anionic transition metal complex and the active group of the ion exchange resin at each active group site.

Upon exposure to a reducing agent, such as sodium borohydride, the anionic transition metal complex is reduced at the exchange site to its neutral valence state, i.e., the metallic state. The result is a distribution of transition metal catalyst molecules in and/or on the resin. The process may be repeated to obtain higher metal content if desired, because the reduction step restores the anion at the positively charged active groups of the exchange resin. It is believed that the restored anion associated with the active group is either the anion that had been formerly associated with the transition metal, e.g., chloride from the $[RuCl_6]^{-3}$, or the reducing agent. After rinsing with water, the treated anionic exchange resin beads are ready for use as a catalyst in the reaction of the metal hydride and water to produce hydrogen gas.

Catalyst treatment of cationic exchange resin beads require a slightly different procedure, because the affinity of the cation transition metal complexes for the cationic exchange resins is much weaker than the affinity of anion transition metal complexes for the anionic exchange resins. Despite this additional complication, cationic exchange resins are particularly useful because they can typically withstand harsher environments, especially higher temperatures.

Although transition metals are formally written in their cationic valence state, e.g. $Ru^{+3}$, transition metals form anionic complexes in the presence of common complexing ions, such as chloride. Such anionic transition metal complexes would have little or no attraction for a cation exchange resin bead having negatively charged active groups. This can be avoided by using transition metal salts having non-complexing anions. Non-complexing anions, as used herein, refers to ions that are typically very large and contain a central atom that is fully coordinated, thereby leaving little activity for further complexing with the transition metal. Nonlimiting examples of non-complexing anions of this type include perchlorate ($ClO_{4-}$), hexaflourophosphate ($PF_{6-}$), and tetrafluoroborate ($BF_{4-}$), and mixtures thereof. Transition metal salts having non-complexing anions can be obtained via a precipitation reaction with a transition metal salt and an equimolar amount of a compound having a non-complexing anion. The compound having the non-complexing anion is chosen so that the anion from the transition metal salt precipitates out with the cation associated with the non-complexing anion. For example, a solution of ruthenium trichloride can be reacted with an equimolar amount of silver perchlorate solution. The chloride will precipitate out of solution as silver chloride and leave ruthenium perchlorate in solution. Since perchlorate ions can not complex like chloride ions, only the ruthenium will be hydrated in the cationic form, i.e., $[RuyxH_2O]^{3+}$, wherein x refers to the number of water molecules. It is believed that the hydrated ruthenium typically has a chemical formula $[Ruy6H_2O]^{+3}$.

The pH of the solution containing both transition metal ion and non-complexing ion should be adjusted to as close to 7 as possible without precipitation of ruthenium as a hydrated oxide, before contacting the cationic exchange resin beads. Preferably, the solution containing the transition metal ion and the non-complexing ion has a pH of greater than or equal to about 2, more preferably greater than or equal to about 4, most preferably greater than or equal to about 7. This pH adjustment prevents hydrogen cations, H+, from competing for cationic sites, i.e., associate with the negatively charged active groups, of the cationic exchange resin. For example, if a 1 Molar solution of ruthenium is used and the pH is 2, ruthenium ions will outnumber hydrogen ions by a factor of 100. Although the ratio of ruthenium ions to hydrogen ions at pH 2 is sufficient, the ratio would be even better at pH's closer to 7. Without wanting to be limited by any one theory, it is believed that upon contacting the cationic exchange resin beads with the transition metal salt solutions, the positively charged transition metal ions exchange with the positive ions initially associated with the negatively charged active groups of the cationic exchange resin.

To insure high displacements of the transition metal ions without using excessive quantities of transition metal salt solutions, the exchange can be performed by contacting the cationic exchange beads with transition metal salt solutions in a tube or column. This method can also be used to treat the previously-described anionic exchange resins. The tube or column is usually mounted vertically and filled with cationic exchange beads. The solution containing transition metal ions and non-complexing ions is allowed to pass through the column of beads. Typically, more dilute solutions are used first and then progressively more concentrated solutions can be used thereafter, thereby allowing the use of the concentrated solutions from the end of prior batches at the beginning of subsequent batches. Large quantities of catalyst treated cationic resin beads can be produced by utilizing a continuous counter-current system that allows virtually complete utilization of ruthenium and complete saturation of the beads. A continuous counter-current system means contacting the more dilute ruthenium solution with the less treated beads and the more concentrated ruthenium solution with the more treated beads. After exchanging the transition metals onto and/or into the beads, the cationic exchange resins are rinsed with deionized water and then reacted with a solution containing a reducing agent, such as sodium borohydride, to reduce the ruthenium to its neutral valence state. Higher transition metal content can be obtained by repeating the exchange and/or reduction steps, because the reduction step restores cations at the negatively charged active groups of the exchange resin. It is believed that the restored cation associated with the active group is provided by the reducing agent, i.e., sodium from the sodium borohydride. After rinsing with water, the treated cationic exchange resin beads are ready for use as a catalyst in the reaction of the metal hydride and water to produce hydrogen gas.

III. Controlled Hydrogen Generation

Since the metal hydride solutions of the present invention are stabilized, hydrogen will not be generated in any appreciable rate unless the stabilized solution contacts the catalyst. Upon removal of the catalyst, no hydrogen generation occurs. As a result, hydrogen generation can be easily controlled by either contacting with, or separating the catalyst from, the stabilized metal hydride solutions.

Figure 2:
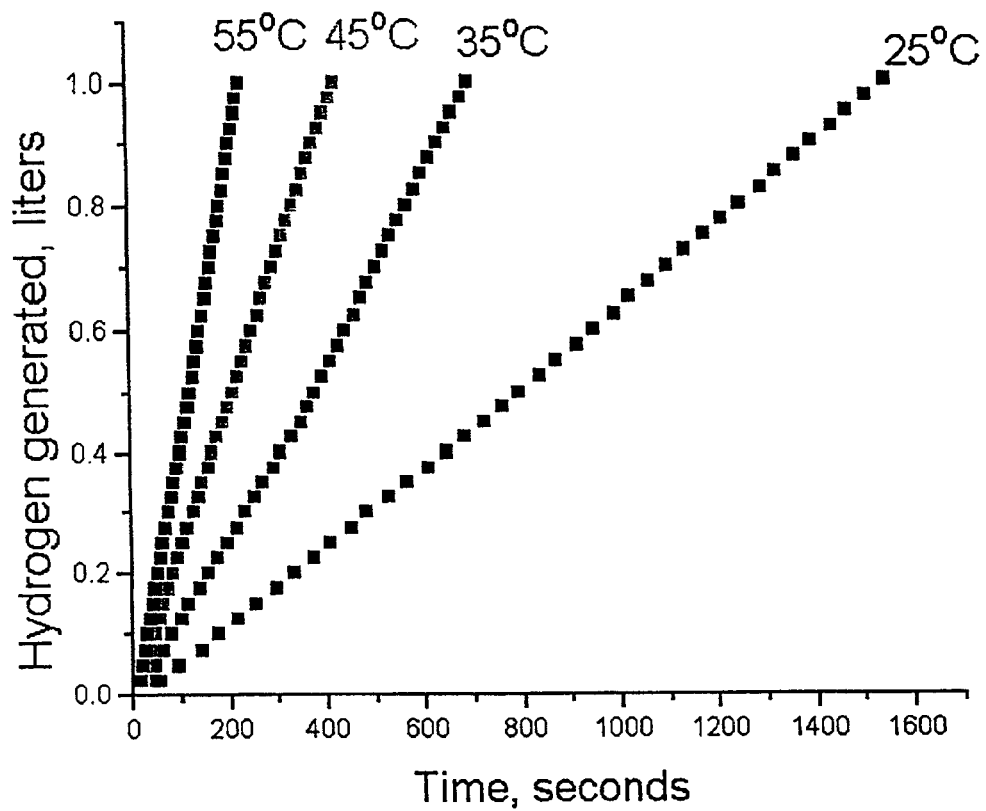
FIG. 2 shows a graph of the volume of hydrogen generated versus time for several different reaction temperatures utilizing a ruthenium supported catalyst according to the present invention.

The reaction of metal hydride with water is not only dependent on the surface area of the catalyst but is also dependent on temperature. FIG. 2 plots hydrogen generated (liters) versus time (seconds) at various temperatures for a hydrogen generation system, wherein the catalyst system includes a 5% by weight of Ru on IRA 400 exchange resin and the metal hydride solution includes 20% by weight sodium borohydride, 10% by weight sodium hydroxide, and the remainder water. A variety of water sources can be used, e.g., sea water. As illustrated by FIG. 2, higher rates of hydrogen gas production occur as the reaction temperatures increase. Since the rate of hydrogen generation is fairly constant even for decreasing concentrations of borohydride, as illustrated by FIG. 1, the hydrogen generation rate is fairly constant at a given temperature until the metal hydride concentration in solution is almost exhausted. As can be recognized by one of ordinary skill in the art, the desired rate of reaction can be obtained by controlling the temperature of the reaction, choosing a particular catalyst, and changing the concentration of the stabilizing agent.

Several methods are available to contact the stabilized metal hydride solution and the catalyst system. When hydrogen is required, the solution can be pumped to a chamber containing the catalyst, or the catalyst can be moved into a tank containing the solution. The metal hydride solution can be pumped either in batches or continuously. The instantaneous demand for hydrogen can be met with a small buffer tank that always holds some hydrogen gas. The hydrogen gas can be immediately supplied upon demanded from this tank. The resultant pressure drop can trigger the system to produce more hydrogen gas to keep a constant supply of hydrogen available to the hydrogen consuming device.

Figure 8A:
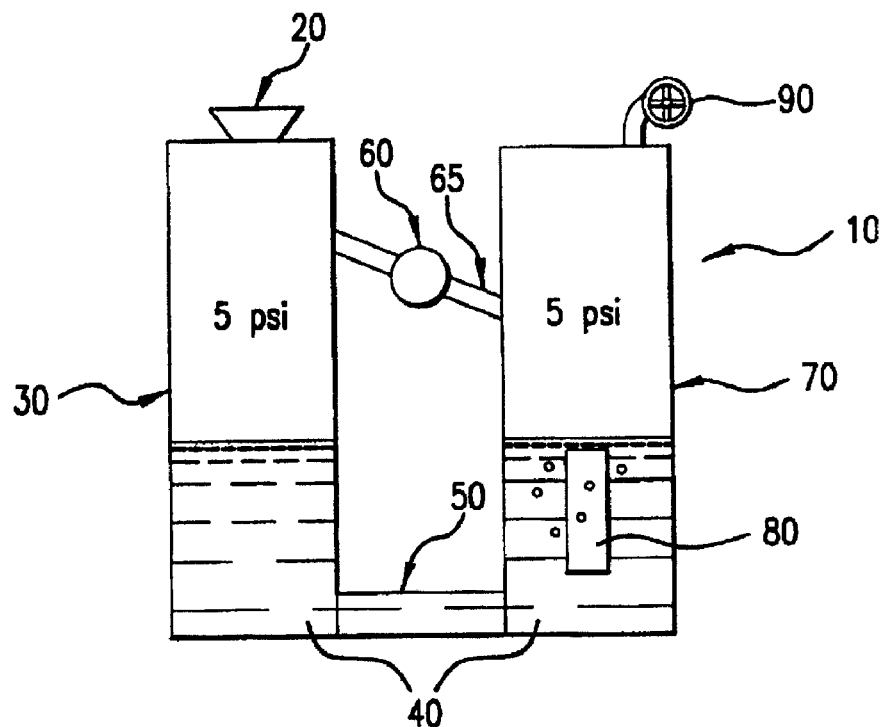
FIGS. 8A and 8B show illustrations of one embodiment of the present invention that has no moving parts and at different stages during hydrogen generation.
Figure 8B:
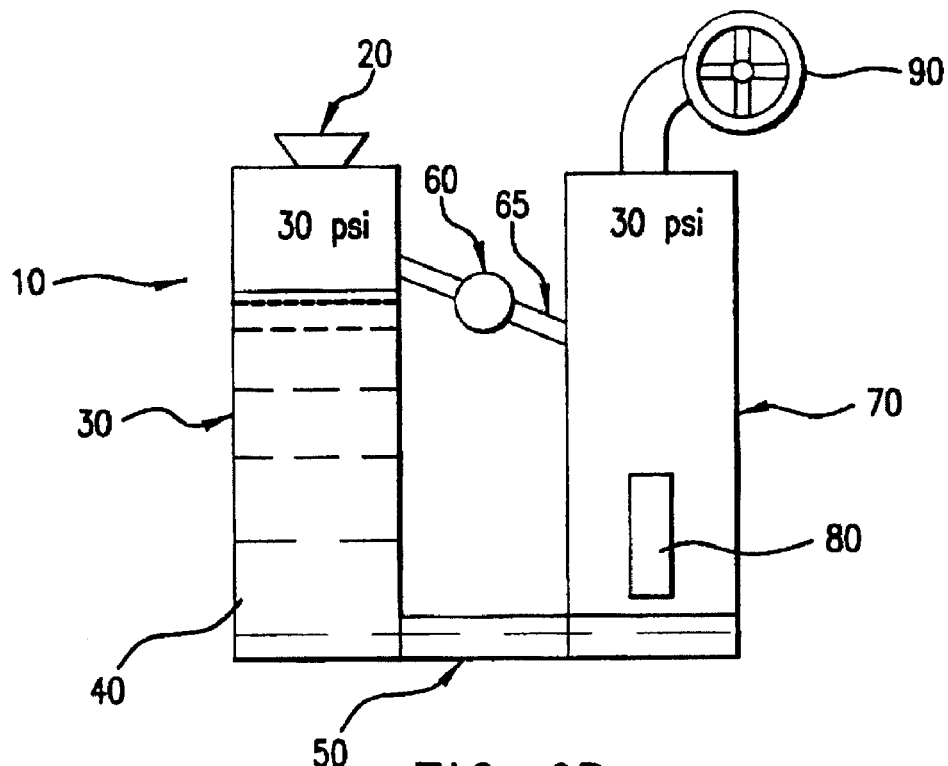

As illustrated by FIGS. 8A and 8B, one embodiment of the present invention 10 has no moving parts and uses pressure equalization to move $NaBH_4$ solution from a reservoir 30 through a tube 50 connecting the bottom of the reservoir into a reaction chamber 70 having a hydrogen generation catalyst system 80. The reservoir is filled through a re-sealable air tight opening 20, and the pressure in the reservoir 30 and reaction chamber 70 can be equalized through connecting tube 65 and control valve 60. When the $NaBH_4$ solution level in the reaction chamber reaches the level of the hydrogen generation catalyst system 80, hydrogen is generated. The hydrogen generation catalyst system 80 includes a tube made out of stainless steel screen, which contains the hydrogen generation catalyst. While hydrogen is being generated, pressure differences will force $NaBH_4$ solution away from the catalyst tube and stop hydrogen generation, as shown in FIG. 8B. When a sufficient amount of hydrogen has been consumed through control valve 90, the pressure drop once again allows $NaBH_4$ solution to contact the catalyst, as shown in FIG. 8A. This compact, self-regulating design requires no external power source.

Figure 9:
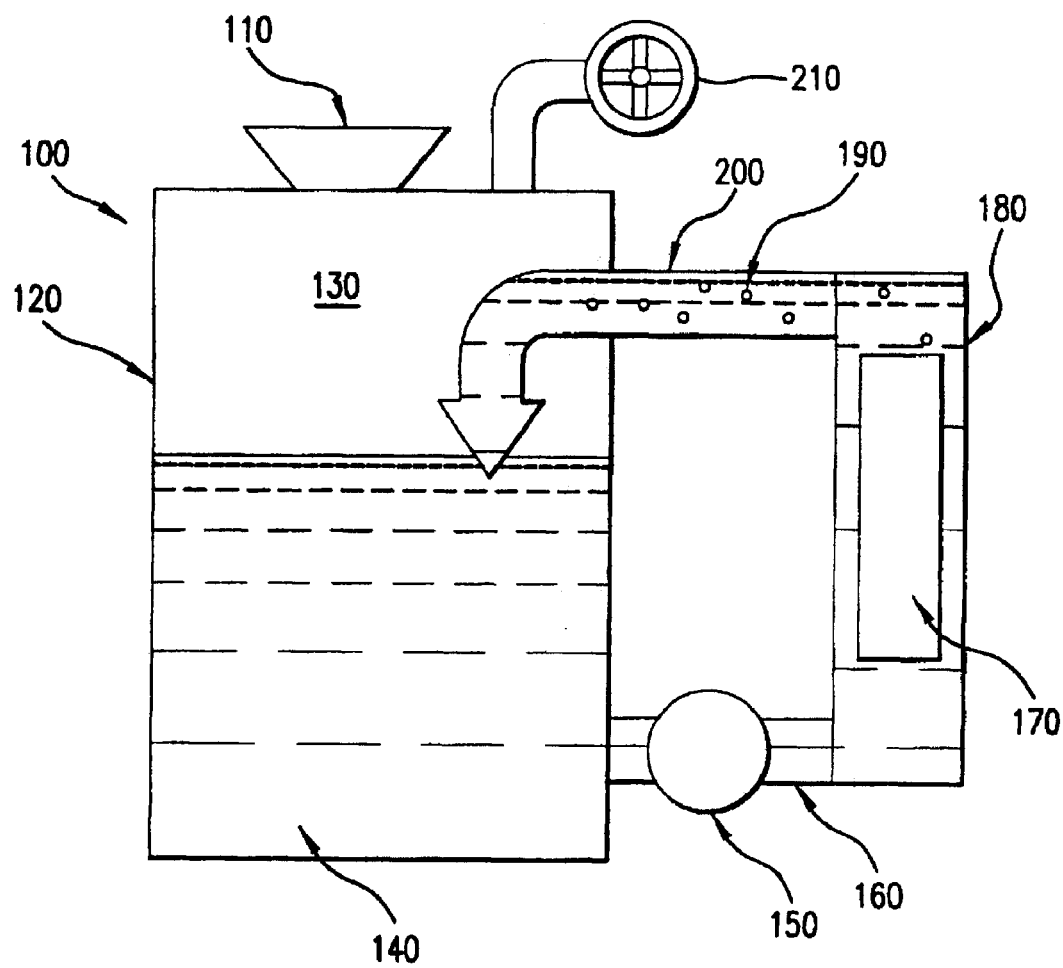
FIG. 9 shows an illustration of another embodiment of the present invention that has a mechanical pump.
Figure 10:
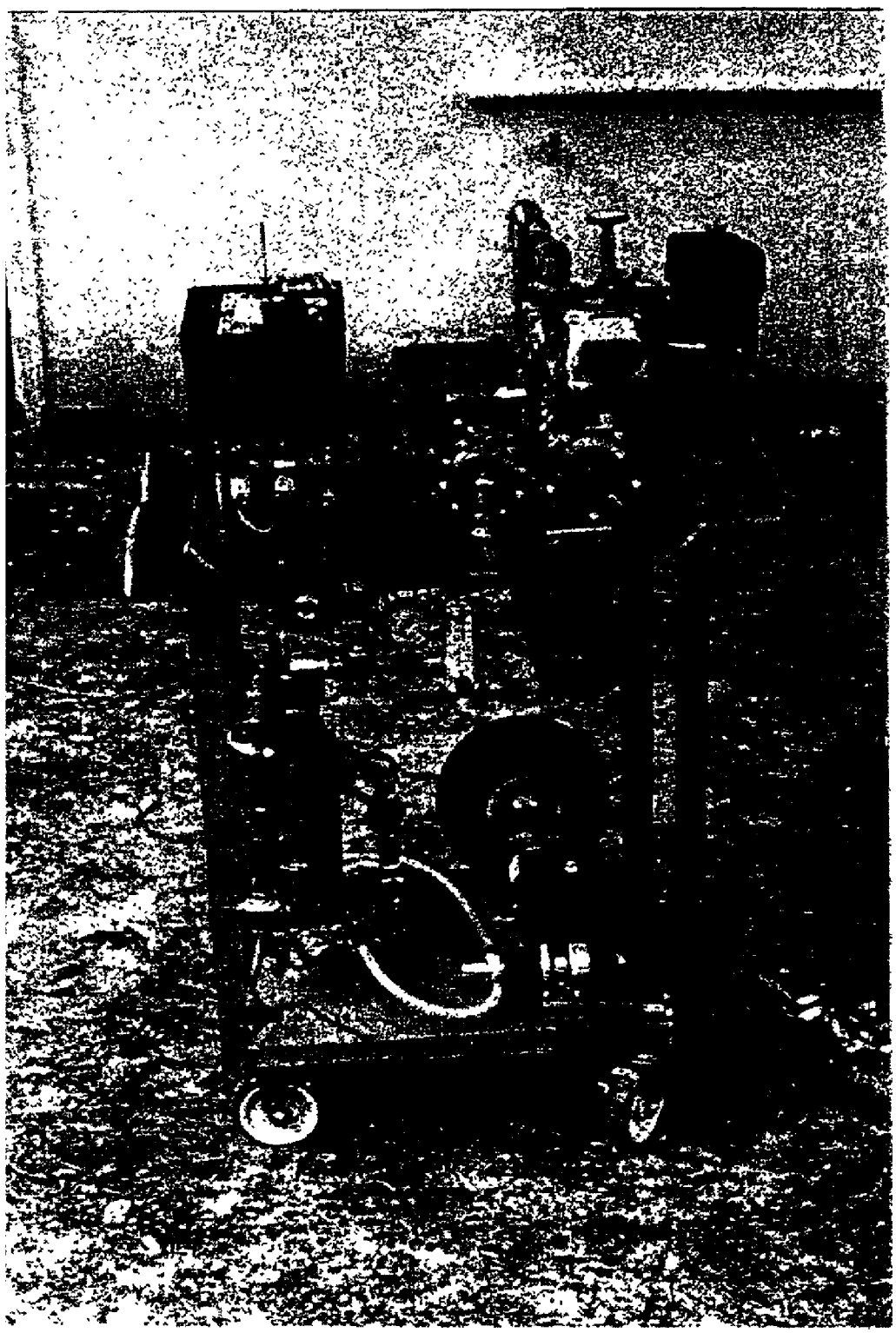
FIG. 10 shows a photograph of the embodiment illustrated in FIG. 8A in combination with a prototype series hybrid engine.

As illustrated by FIG. 9, another embodiment of the present invention 100 includes a reservoir 120 that is filled with $NaBH_4$ solution 140 via a re-sealable airtight opening 110. The reservoir also has a head space 130, which acts as a storage buffer for hydrogen gas, and a control valve 210 through which hydrogen can be vented as needed. The bottom of the reservoir is connected via tube 160 to a reaction chamber 180 having a hydrogen generation catalyst system 170, which includes a tube made out of stainless steel screen containing the hydrogen generation catalyst. The top of the reaction chamber 180 is connected to an upper portion of reservoir 120 via tube 200. Hydrogen gas 190 is generated when a mechanical pump 150 in tube 160 meters $NaBH_4$ solution 140 through hydrogen generation catalyst system 170. This design has very rapid response to hydrogen requirement. The pump 150 runs the borohydride solution over the catalyst and pressure builds up. Above a certain pressure in head space 130, the pump 150 can reverse direction to drain the catalyst chamber and thereby stop hydrogen production. The pump 150 then shuts off. When the hydrogen pressure drops below a certain predetermined point in head space 130, the pump 150 turns back on in the forward direction to refill reaction chamber 180, generate additional hydrogen gas and replenish hydrogen pressures. FIG. 10 is a photograph of the embodiment in FIG. 9 connected to a prototype series hybrid engine. The hydrogen generator is located at the bottom, left side of the cart. The engine includes a 3 kW internal combustion engine that has been converted from gasoline to run on hydrogen, and a 1 kW alternator. A standard automotive (discharge) battery, an electric motor, a wheel drive, and lights served as a load. Depending on the state of charge of the battery, the engine required between 5 and 12 liters of hydrogen per minute to run.

Figure 11A:
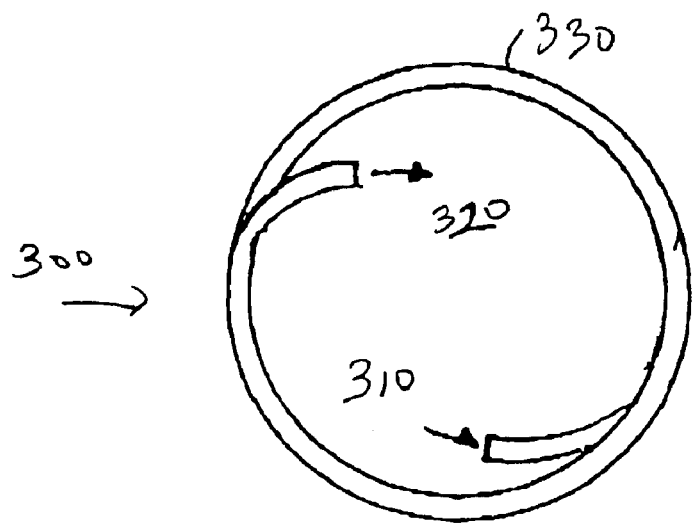
FIGS. 11A and 11B is an illustration of another embodiment for the reaction chamber of the present invention.
Figure 11B:
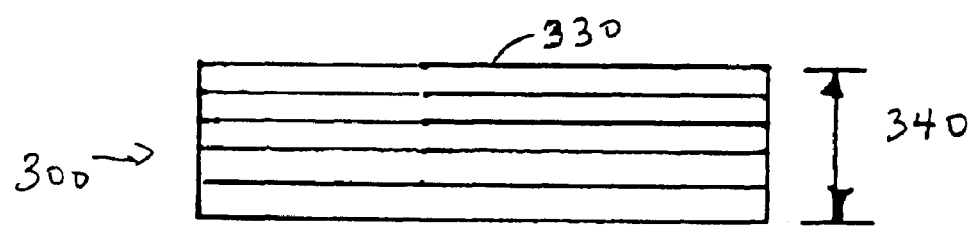

FIGS. 11A and 11B illustrate another embodiment of the catalyst chamber 300. In this embodiment a flexible piece of stainless steel tubing 330 is used as the catalyst chamber 300, which is attached via a pump (not shown) to a reservoir (not shown) containing fresh metal hydride solution at one end 310 and a waste reservoir (not shown) for the reacted metal hydride solution at the other end 320. Both ends can be further covered by a suitable mesh, as described above. FIG. 11A is a top view of a coiled length of flexible stainless steel tubing, and FIG. 11B is a side view of the same tubing. Any appropriate length of tubing can be used, and the tubing can be coiled, for example into 5 coils 340, to maximize use of space. The full length of the tubing can be filled with a catalyst system, as described above. Transition metal supported beads, resins, ribbons, and/or even rope can be used. Alternatively, transition metal formed into wires, mesh, or particles (assuming that a containment system, as described above, is used for the particles) can be used. A pump, not shown, can be used to control hydrogen production by controlling flow of metal hydride solution into the flexible tubing. The waste reservoir can also store hydrogen, or the hydrogen can be vented off from the waste reservoir to a separate hydrogen storage tank.

EXAMPLES

The following examples further describe and demonstrate embodiments within the scope of the present invention. The examples are given solely for the illustration purposes and are not to be construed as limitations of the present invention, as many variations thereof are possible without departing from the spirit and scope of the invention.

Example 1

Preparation of Catalysts Systems With Anionic Exchange Resin Substrates

One gram of ruthenium trichloride was dissolved in 20 ml of 10% hydrochloric acid to form chlororuthenic acid. The ruthenium is, therefore, contained in an anionic complex of $[RuCl_6]^{-3}$. This solution containing the anionic transition metal complex was exchanged by soaking onto Rohm & Haas IRA-400 anionic resin beads having a mesh size of about 30. Other anionic resins, such as Rohm & Haas A-26, can also be used in a similar manner. Since the resin beads are usually supplied in the Cl⁻ form, the chloride ion was easily replaced. The exchange coefficient for this type of complex was very high. It is, therefore, believed that almost all the available exchange sites, i.e., positively charged active groups, were ionically bound with $[RuCl_6]^{-3}$, as evidenced by a marked change in color from transparent yellow-orange to dark red. The resin beads were then rinsed with water to remove excess acid and ruthenium salts. This rinsing did not remove any bound ruthenium. Anionic resin beads can absorb between 1.5 to 2 milli-equivalents of ruthenium per gram of resin beads. Since the molecular weight of ruthenium is 101 g/mole, the resin beads were weighed to determine the increase in weight. The exchanged resin beads were loaded with about 5% by weight of ruthenium after about 3 to 4 treatments. Higher loadings are possible if excess chloride is not present to compete for sites on the resin bead. This may be accomplished by using less hydrochloric acid initially or by raising the pH to about 2 to 3.

The exchanged resin beads were then treated with a reducing agent solution containing 20% by weight of sodium borohydride, 10% by weight of sodium hydroxide, and 70% by weight of water. The dark red resin beads turned black as the ruthenium complex was reduced to ruthenium metal. The resin beads were ready for use after rinsing with water. Typically, the resin beads treated with catalyst can be placed into a chamber made from a fine screen or other material that allows both borohydride fuel and hydrogen gas to pass freely through the chamber while preventing the small beads from leaving.

Figure 3A:
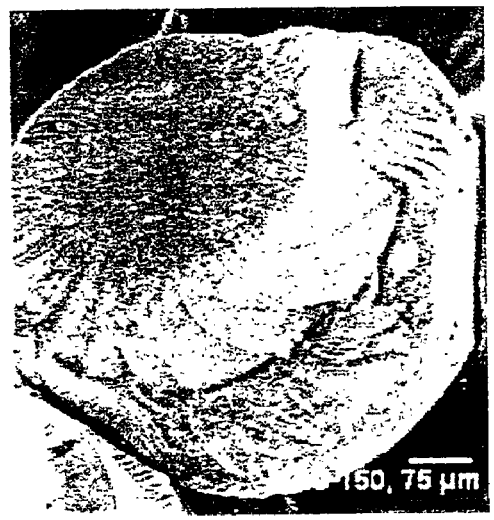
FIGS. 3A, 3B, and 3C show a scanning electron micrograph and two X-ray scan micrographs, respectively, of a hydrogen generation catalyst having ruthenium supported on an ion exchange resin, according to the present invention.
Figure 3B:
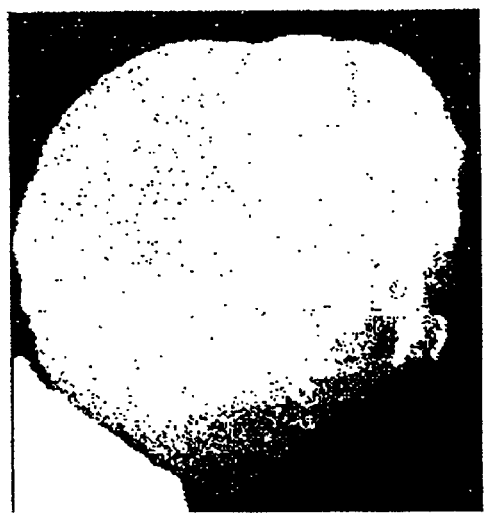
Figure 3C:
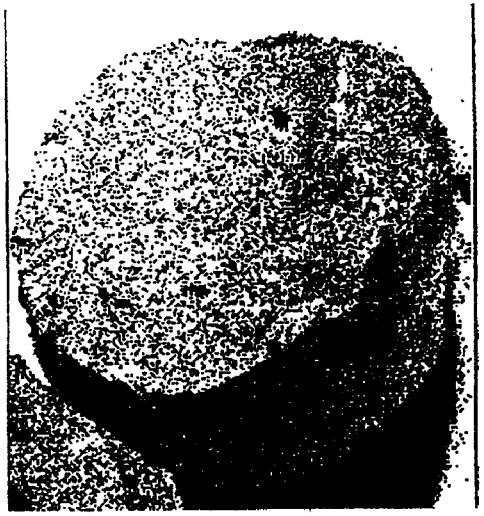

FIG. 3A provides a micrograph from a scanning electron microscope (SEM) of a ruthenium treated resin bead. The SEM used is model SR-50 manufactured by ISI Corporation. FIGS. 3B and 3C are X-ray scans of the same ruthenium treated bead obtained from a UTW Micro Z detector manufactured by Evex Analytical Company. The detector is able to detect X-ray radiation at a particular frequency level for a particular element or compound. FIG. 3B is an X-ray area scan showing the distribution of ruthenium (blue regions) in the resin bead, and FIG. 3C is an X-ray area scan showing the distribution of carbon (yellow regions) in the resin bead and also in the conductive carbon tape. A comparison of FIGS. 3B and 3C show that a significant amount of ruthenium was deposited on and throughout the resin bead. This result is expected,-since the functional groups of the resin bead attracts the ruthenium ion. FIGS. 4A–4C provide an SEM micrograph and X-ray scans of the fibers of a standard nylon rope that was treated with ruthenium, as described above. A comparison of FIGS. 4B and 4C show that ruthenium did not permeate throughout the fiber, but rather only coated the surface of the fibers. This shows that for the nylon fibers, straight diffusion coating resulted.

Figure 5:
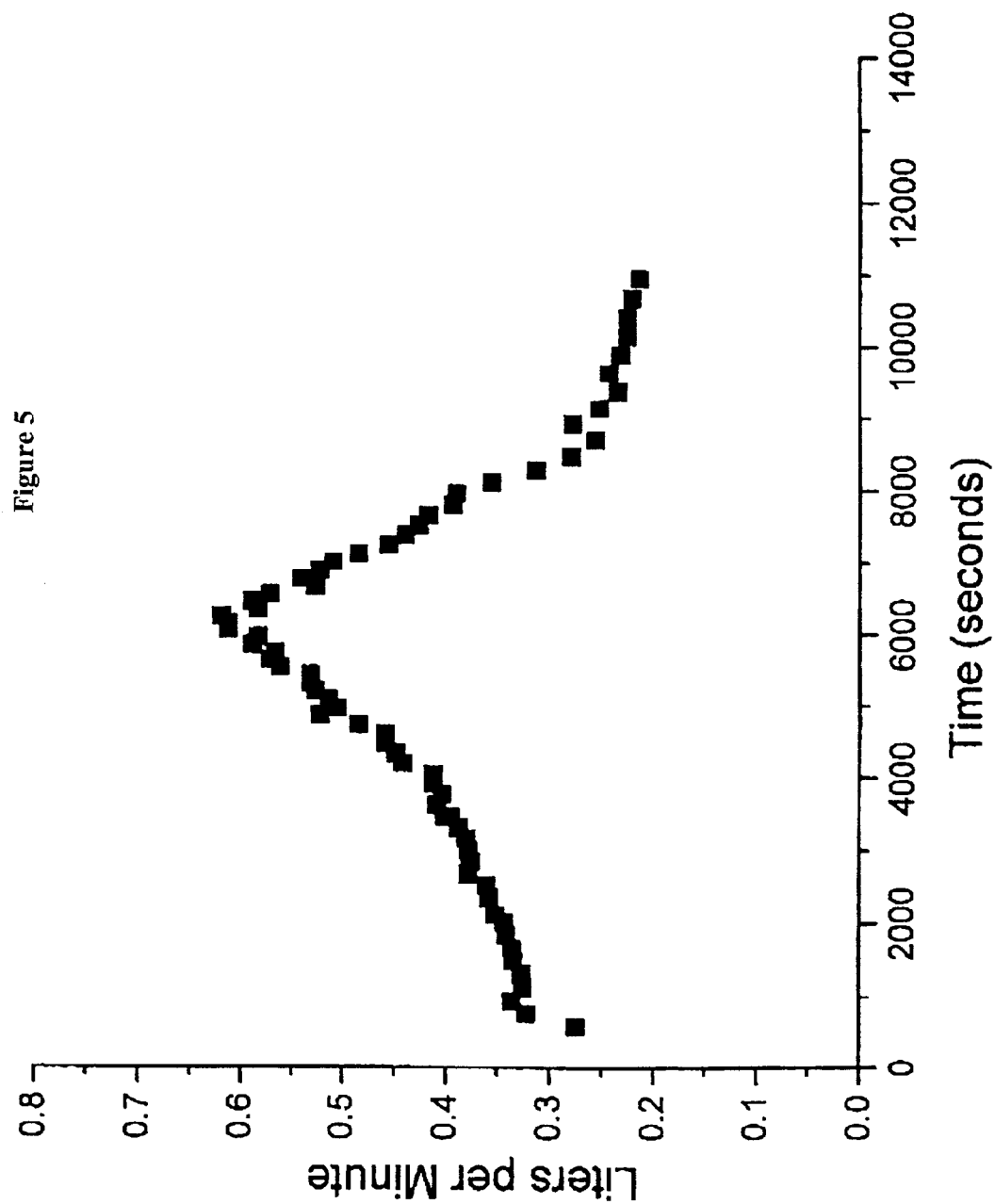
FIG. 5 shows a graph of hydrogen generation rate versus time for a ruthenium supported hydrogen generation catalyst according to the present invention.
Figure 6:
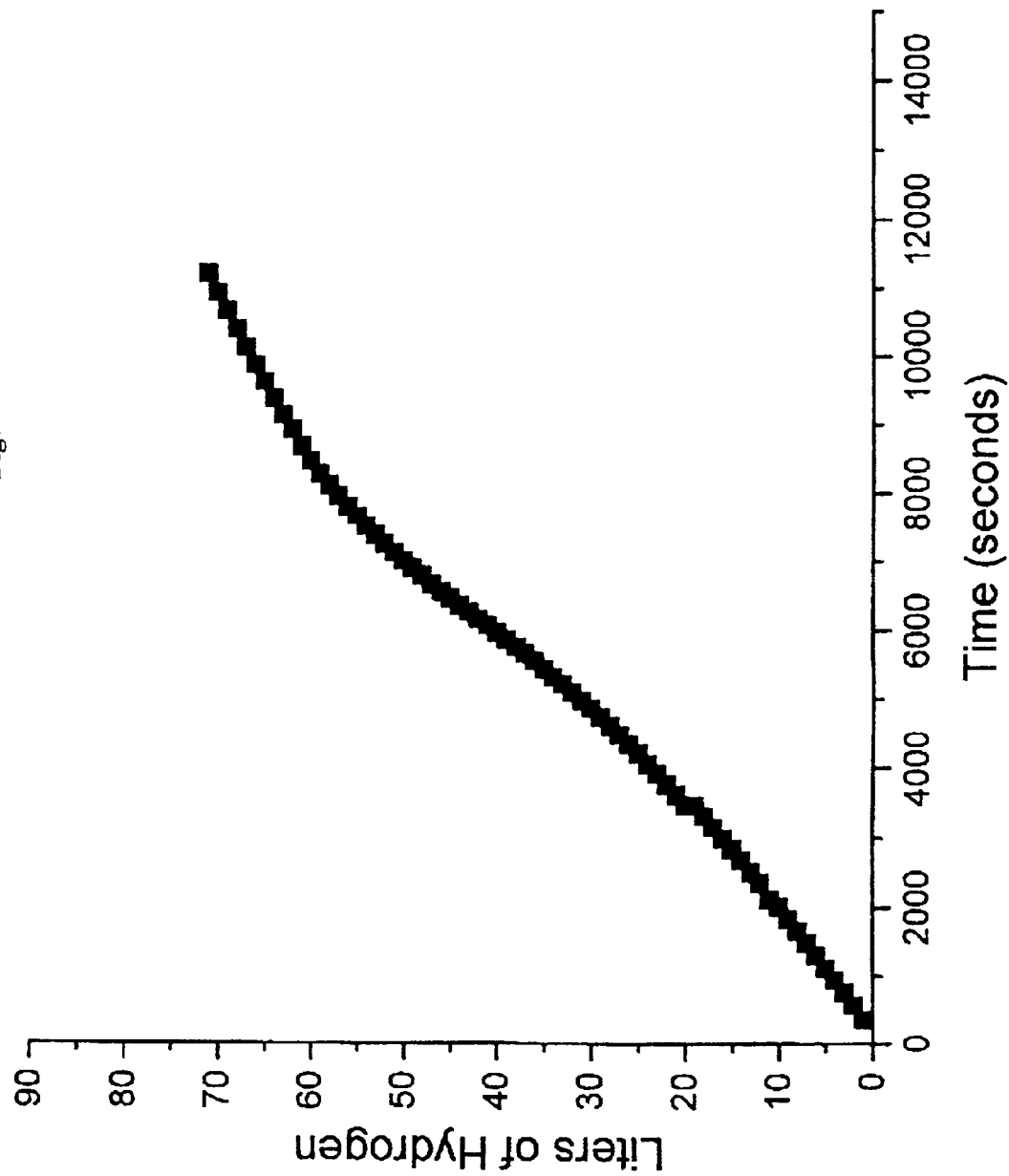
FIG. 6 shows a graph of the total amount of hydrogen produced versus time for a ruthenium supported hydrogen generation catalyst according to the present invention.

The resulting supported hydrogen generation catalysts were tested for hydrogen generation in a stabilized borohydride solution. One test compared hydrogen generation at various concentrations of sodium borohydride. The results are illustrated in FIG. 1, which is a graph of hydrogen gas generation rate ([liters/sec-gram catalyst]$\times 10^{-5}$) vs. concentration of sodium borohydride (% by weight) at 25° C. at various concentrations of NaOH, using about 0.25 grams of Rohm & Haas IRA-400 exchange resin beads with 5% ruthenium by weight. A second test compared hydrogen generation at different reaction temperatures. The results are illustrated in FIG. 2, which is a graph of hydrogen generation (liters) versus time (seconds) at different temperatures for a hydrogen generation system, wherein the catalyst system includes about 0.25 grams of a 5% by weight Ru on Rohm & Haas IRA-400 exchange resin, and wherein the metal hydride solution includes 20% by weight sodium borohydride, 10% by weight sodium hydroxide, and 70% by weight water. A third test was conducted to determine the rate of hydrogen gas generation using 0.5 grams of 5% by weight ruthenium on Rohm & Haas IRA-400 anionic exchange resin beads and a stabilized metal hydride solution having 20% by weight sodium borohydride, 5% by weight sodium hydroxide, and the remainder water. The results are provided in FIG. 5, which is a graph of hydrogen generation rate (liters/min.) vs. time (seconds), and FIG. 6, which is a graph of total hydrogen generated (liter) vs. time seconds.

Figure 7:
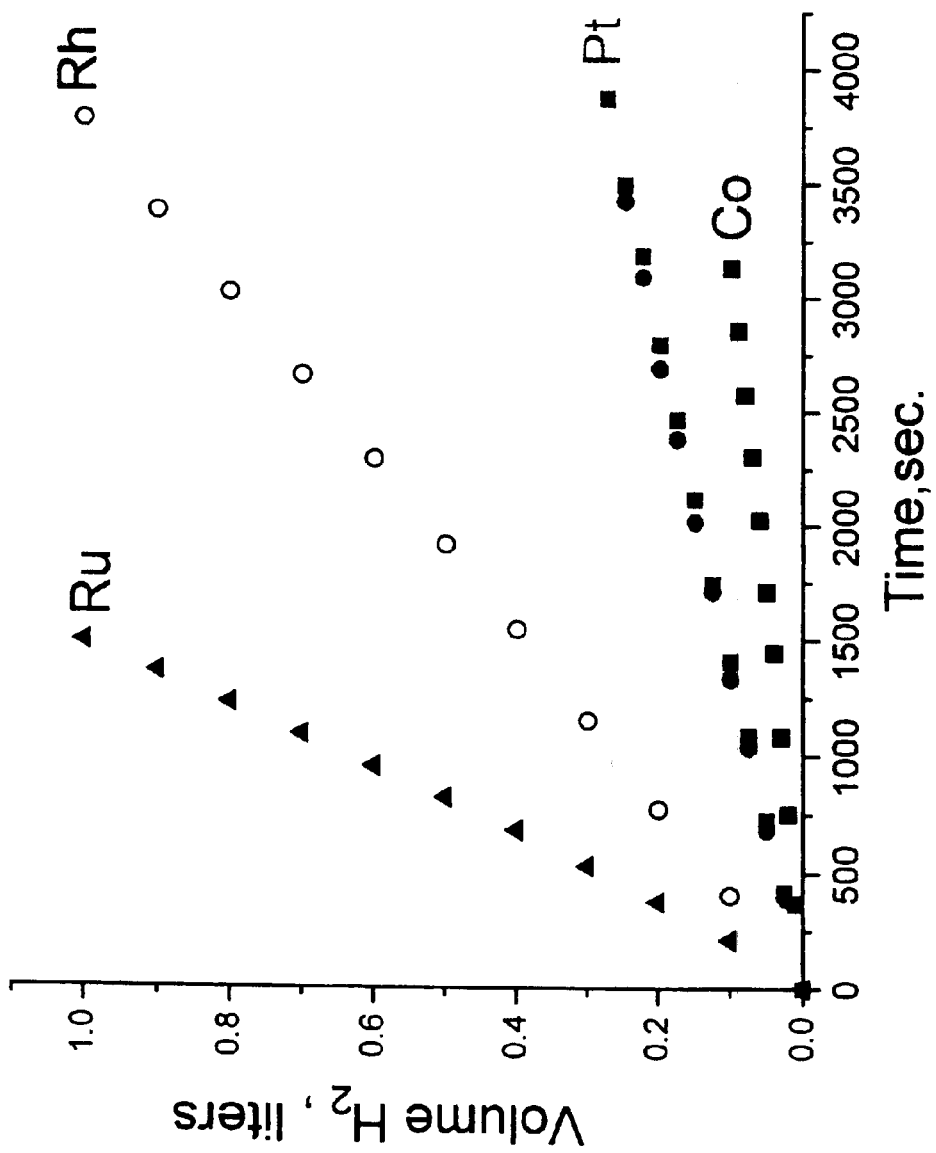
FIG. 7 shows a graph of hydrogen generation versus time for four different supported catalysts according to the present invention: a ruthenium supported catalyst; a rhodium supported catalyst; a platinum supported catalyst; and a cobalt supported catalyst.

Example 1 was repeated to produce Rohm & Haas IRA-400 anionic exchange resin beads loaded with 5% by weight of ruthenium, platinum, and cobalt, respectively. The four different anionic exchange resin catalysts (i.e., ruthenium, rhodium, platinum, and cobalt) were tested for hydrogen generation. The results are illustrated in FIG. 7, which shows a plot of hydrogen volume (liters) vs. time (seconds) for the reaction of 0.25 grams of 5% by weight loading on Rohm & Haas IRA-400 anionic resin beads of each respective catalyst with a stabilized metal hydride solution containing 20% by weight of sodium borohydride, 10% by weight of sodium hydroxide, and 70% by weight water. As can be seen from FIG. 7, the anionic exchange resins with ruthenium provided the best hydrogen generations rates with the rest of the catalysts performing in the following order: rhodium>platinum>cobalt.

Example 2

Preparation of Catalysts Systems With Ceramic and/or Carbon Substrates

Zirconium dioxide, $ZrO_2$, 8 mesh chips from Alfa-Aesar, located in Massachusetts, were soaked in a solution of ruthenium trichloride at a concentration of about 5% by weight. Without wanting to be limited by any one theory, it is believed that the ruthenium trichloride was absorbed by the porous zirconium dioxide bead. The beads were then filtered but not rinsed, and placed in a drying oven at 110° C. until dry. The ruthenium trichloride absorbed onto and/or within the beads were then reduced with a solution including 20% by weight of sodium borohydride, 10% by weight of sodium hydroxide, and 70% by weight of water. The beads were heated in the solution for about 30 minutes at 65° C. After rinsing with water, the beads were ready for use in the hydrogen systems of the present invention. Almost all other porous substrates, such as ceramic and carbon substrates, can be converted in a similar manner.

If other catalysts are desired, such as cobalt or nickel, the corresponding chlorides of each catalyst can be used instead of the ruthenium trichloride, as described above in Examples 1 and 2. A combination of catalysts is also possible. This can be achieved in one of two ways. One method is to simply premix the transition metal salts, e.g., cobalt chloride and ruthenium chloride. The solution of the mixed transition metal salts is then used as described above in Examples 1 and 2. The other method is to sequentially add and then reduce each catalyst individually, as described above, onto the same substrate. Such sequential addition and reduction provides layered absorption of the catalysts onto and/or into the substrate.

Example 3

Preparation of Catalyst Systems With Cationic Exchange Resin Substrates

As described earlier with cationic resins, ruthenium trichloride was reacted with silver perchlorate solution in a 1:3 molar ratio of Ru:Ag to obtain 0.5 grams of elemental ruthenium. Precipitation of silver chloride was observed. After filtering out the precipitate, sodium hydroxide was dropwise added to the remaining solution of ruthenium perchlorate to adjust the pH to about 7. A vertical column was packed with 10 grams of Rohm & Haas IRA-120 cation exchange resin beads. The ruthenium perchlorate solution was repeatedly poured down the column until the solution no longer had a reddish color, thereby obtaining cationic exchange beads with 5% by weight of ruthenium (0.5 grams of ruthenium for 10 grams of resin beads). After exchanging the ruthenium onto and/or into the beads, they were rinsed with deionized water and reacted with a solution of sodium borohydride as the reducing agent. The dark red resin beads turned black as the ruthenium complex, was reduced to ruthenium metal. After rinsing with water, the resin beads were ready for use in the hydrogen systems of the present invention.

Example 4

Preparation of Catalyst Systems by Electrochemical Plating

A nickel substrate was placed in a solution of 0.01 M ruthenium trichloride, 0.01 HCl, and 0.1 M KCl. Other conductive substrates, such as gold, and stainless steel can also be used. The substrate was then used as the cathode while the voltage was varied from about 0.5 volts versus standard Calomel Electrode (SCE) to about −1.5 volts SCE with a sweep rate of about 50 millivolts per second, thereby providing a cycle time of about 40 seconds. The current was applied for about one hour. The resulting coating on the substrate was black and dull in appearance. The current can be supplied for as long as necessary to obtain the desired thickness. The resulting ruthenium black coated substrates can be used in the hydrogen generation systems of the present invention.

We claim:

1. A hydrogen generating apparatus comprising:
    a reservoir containing a solution capable of generating hydrogen, said reservoir comprising a hydrogen outlet;
    a reaction chamber having a catalyst that, upon contact with said solution, accelerates the generation of hydrogen from said solution and transforms said solution into a spent solution and hydrogen, wherein said catalyst is attached to a substrate;
    a first passageway connecting said reservoir and said reaction chamber and adapted to transport said solution from said reservoir to said reaction chamber;
    a second passageway connecting said reservoir and said reaction chamber and adapted to transport said spent solution to said reservoir whereupon it is added to said solution; and
    a pump in communication with said reservoir and said reaction chamber, said pump being configured to pump said solution from said reservoir to said reaction chamber via said first passageway.

2. The apparatus of claim 1 wherein said pump furnishes said solution to said reaction chamber in response to a first pressure in said reaction chamber.

3. The apparatus of claim 1 further including a control valve for coupling the generated hydrogen from said apparatus.

4. The apparatus of claim 1 wherein said reservoir includes a re-sealable airtight opening.

5. The apparatus of claim 1 wherein said substrate is selected from the group consisting of ceramics, plastics, polymers, glass, textiles, fabrics, metals, and alloys.

6. The apparatus of claim 1 wherein said substrate has a form selected from the group consisting of fiber, rope, wire, bead, and mesh.

7. A hydrogen generating apparatus comprising:
    a reservoir containing a solution capable of generating hydrogen;
    a reaction chamber having a catalyst that, upon contact with said solution, accelerates the generation of hydrogen from said solution and transforms said solution into a spent solution;
    a first passageway connecting said reservoir and said reaction chamber and adapted to transport said solution from said reservoir to said reaction chamber;
    a second passageway connecting said reservoir and said reaction chamber and adapted to transport said spent solution to said reservoir whereupon it is added to said solution; and
    a pump configured to pump said solution from said reservoir to said reaction chamber via said first passageway, wherein said pump is a reversible pump capable of transporting the spent solution back into the reservoir via said first passageway, and the solution into the reaction chamber via the first passageway, and is operative in response to pressure in said reaction chamber.

8. The apparatus of claim 7 wherein said pump furnishes said solution to said reaction chamber in response to a first pressure in said reaction chamber.

9. The apparatus of claim 8 wherein said pump conducts said solution back from said reaction chamber in response to a second pressure in said reaction chamber.

10. The apparatus of claim 7 further including a control valve for coupling the generated hydrogen from said apparatus.

11. The apparatus of claim 7 wherein said reservoir includes a re-sealable airtight opening.

12. The apparatus of claim 7 further comprising a containment means configured to hold said catalyst, said containment means being provided within said reaction chamber.

13. The apparatus of claim 12 wherein said containment means is a substrate.

14. The apparatus of claim 13 wherein said substrate is selected from the group consisting of ceramics, plastics, polymers, glass, textiles, fabrics, metals, and alloys.

15. The apparatus of claim 13 wherein said substrate has a form selected from the group consisting of fiber, rope, wire, bead, and mesh.

16. A hydrogen generating apparatus comprising:
a reservoir containing a solution capable of generating hydrogen, said reservoir comprising a hydrogen outlet;
a reaction chamber having a catalyst that, upon contact with said solution, accelerates the generation of hydrogen from said solution and transforms said solution into a spent solution and hydrogen;
a first passageway connecting said reservoir and said reaction chamber and adapted to transport said solution from said reservoir to said reaction chamber;
a second passageway connecting said reservoir and said reaction chamber and adapted to transport said spent solution to said reservoir whereupon it is added to said solution; and
a pump configured to pump said solution from said reservoir to said reaction chamber via said first passageway, wherein said pump conducts said solution to said reaction chamber in response to a first pressure in said reaction chamber, and wherein said pump conducts said solution back from said reaction chamber in response to a second pressure in said reaction chamber.

17. A hydrogen generating apparatus comprising:
a reservoir containing a solution capable of generating hydrogen, said reservoir comprising a hydrogen outlet;
a catalyst that, upon contact with said solution, accelerates the generation of hydrogen from said solution and transforms said solution into a spent solution and hydrogen, said catalyst being supported by a substrate; and
a pump configured to regulate contact of said solution and said catalyst and to introduce said spent solution into said solution.

18. A hydrogen generating apparatus comprising:
a reservoir containing a solution capable of generating hydrogen;
a catalyst that, upon contact with said solution, accelerates the generation of hydrogen from said solution and transforms said solution into a spent solution; and
a pump configured to regulate contact of said solution and said catalyst and to introduce said spent solution into said solution, wherein said pump is a reversible pump capable of transporting the spent solution back into the reservoir via said first passageway, and the solution into the reaction chamber via the first passageway, and is operative in response to pressure in said system produced by the generation of hydrogen.

19. The apparatus of claim 18 wherein said pump operates in one mode in response to a first pressure.

20. The apparatus of claim 19 wherein said pump operates in a second mode different from said first mode in response to a second pressure.

21. The apparatus of claim 19 wherein said pump furnishes said solution to said reaction chamber in response to said first pressure in said reaction chamber.

22. The apparatus of claim 20 wherein said pump conducts said solution back from said reaction chamber in response to said second pressure in said reaction chamber.

23. The apparatus of claim 18 further including a control valve for coupling the generated hydrogen from said apparatus.

24. The apparatus of claim 18 wherein said reservoir includes a re-sealable airtight opening.

25. The apparatus of claim 18 further comprising a containment means configured to hold said catalyst, said containment means being provided within said reaction chamber.

26. The apparatus of claim 25 wherein said containment means is a substrate.

27. The apparatus of claim 26 wherein said substrate is selected from the group consisting of ceramics, plastics, polymers, glass, textiles, fabrics, metals, and alloys.

28. The apparatus of claim 26 wherein said substrate has a form selected from the group consisting of fiber, rope, wire, bead, and mesh.

* * * * *